United States Patent [19]
Uzuki et al.

[11] Patent Number: 5,297,117
[45] Date of Patent: Mar. 22, 1994

[54] INFORMATION RECORDING AND REPRODUCING APPARATUS FOR AUTOMATICALLY LOADING AND UNLOADING AND MANUALLY UNLOADING A RECORDING MEDIUM

[75] Inventors: Kazuo Uzuki, Yokohama; Isamu Nishida, Tokyo, both of Japan

[73] Assignee: Canon Kabushiki Kaisha, Tokyo, Japan

[21] Appl. No.: 839,714

[22] Filed: Feb. 24, 1992

Related U.S. Application Data

[63] Continuation of Ser. No. 659,455, Feb. 21, 1991, abandoned, which is a continuation of Ser. No. 193,783, May 13, 1988, abandoned.

[30] Foreign Application Priority Data

May 19, 1987 [JP] Japan .................. 62-120227
May 19, 1987 [JP] Japan .................. 62-120228

[51] Int. Cl.⁵ .................. G11B 33/02; G11B 17/04
[52] U.S. Cl. .................. 369/75.2; 369/77.2; 360/99.06
[58] Field of Search .................. 369/75.2, 77.1, 77.2, 369/75.1; 360/99.02, 99.03, 99.06, 99.07, 98.05, 98.06, 98.07, 98.08

[56] References Cited

U.S. PATENT DOCUMENTS

| | | | |
|---|---|---|---|
| 4,425,591 | 1/1984 | Ito | 360/105 X |
| 4,620,249 | 10/1986 | Suzaki et al. | 360/99.02 |
| 4,628,376 | 12/1986 | Kato | 360/71 |
| 4,669,009 | 5/1987 | Naoi et al. | 360/99.02 |
| 4,670,802 | 6/1987 | Ogawa et al. | 369/77.2 |
| 4,723,185 | 2/1988 | Maeda | 360/99.07 |
| 4,766,510 | 8/1988 | Okita et al. | 360/99.07 |
| 4,774,613 | 9/1988 | Okita et al. | 360/109 |
| 4,794,481 | 12/1988 | Suyama et al. | 369/72.2 |
| 4,816,945 | 3/1989 | Watanabe | 360/99.07 |
| 4,887,174 | 12/1989 | Tezuka | 360/99.06 |
| 4,964,005 | 10/1990 | Uzuki | 360/99.06 |
| 5,025,339 | 6/1991 | Kanno et al. | 360/99.06 |

FOREIGN PATENT DOCUMENTS 61-31061 2/1987 Japan .................. 369/77.2

Primary Examiner—John H. Wolff
Assistant Examiner—David D. Davis
Attorney, Agent, or Firm—Fitzpatrick, Cella, Harper & Scinto

[57] ABSTRACT

An information recording/reproducing apparatus, for recording and/or reproducing information on and/or from a recording medium, includes an opening formed in a front panel thereof to allow loading and unloading of the recording medium, a device for automatically transporting the recording medium in a transport direction along a transport path, from an unloading position to a loading position and from the loading position to the unloading position, and a member slidable in a direction opposite to the recording medium transport direction, associated with the loading and unloading operations of the recording medium. The member permits manual unloading of the recording medium when the member is pushed into the apparatus or pulled away from the front panel.

9 Claims, 6 Drawing Sheets

INFORMATION RECORDING AND REPRODUCING APPARATUS FOR AUTOMATICALLY LOADING AND UNLOADING AND MANUALLY UNLOADING A RECORDING MEDIUM This application is a continuation of prior application, Ser. No. 07/659,455 filed Feb. 21, 1991, which application is a continuation of prior application, Ser. No. 07/193,783 filed May 13, 1988, both now abandoned.

BACKGROUND OF THE INVENTION

1. Field of the Invention

The present invention relates to an apparatus for recording and/or reproducing information on and from a recording medium, such as an optical disk or an opto-magnetic disk, and more particularly, to an information recording and reproducing apparatus having means for automatically loading and unloading such a recording medium.

2. Related Background Art

An information recording and reproducing apparatus which loads and unloads a recording medium by electric power in order to enhance operability has been known. In such an apparatus, however, if a microcomputer which controls the apparatus malfunction or a power failure occurs while the recording medium is loaded, the electrically powered unloading mechanism is inoperable. As a result, the recording medium cannot be taken out of the apparatus.

U.S. Pat. No. 4,670,802 discloses an information recording and reproducing apparatus which enables removal of the medium in an emergency case by manually rotating a drive shaft of a motor for unloading the medium. In this apparatus, however, the drive shaft has to be rotated several tens of turns to unload the medium, and hence, operability is poor.

SUMMARY OF THE INVENTION

It is an object of the present invention to provide an information recording and reproducing apparatus which manually unloads a recording medium by a simple operation in an emergency.

The above object of the present invention is achieved in an information recording and reproducing apparatus which automatically loads and unloads the recording medium by providing a member which, when slid in a direction of transportation of the recording medium can manually move the recording medium to an unloading position.

DETAILED DESCRIPTION OF THE PREFERRED EMBODIMENTS

Figure 1:
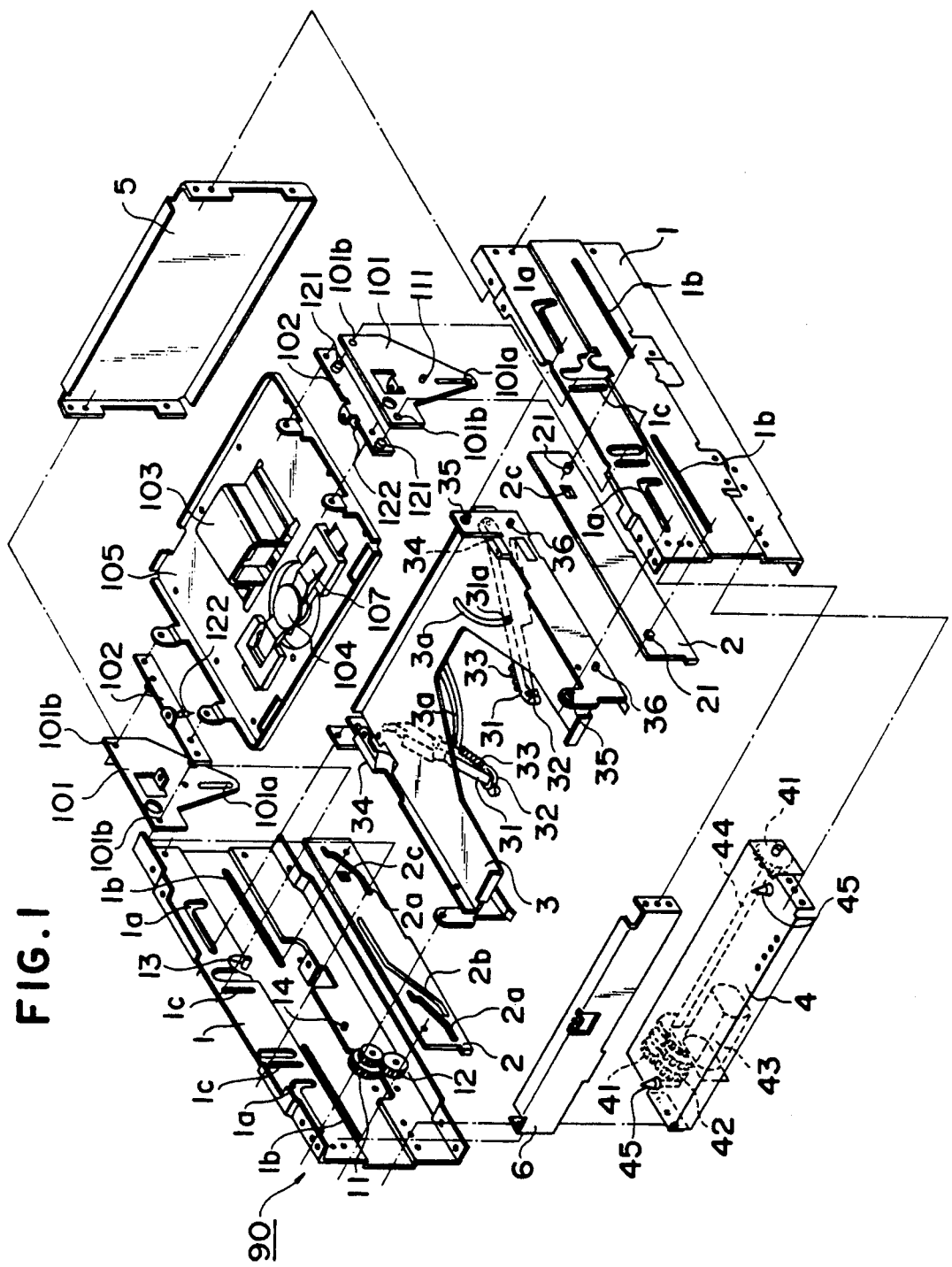
FIG. 1 shows a developed perspective view of an opto-magnetic disk apparatus to which the present invention is applied.

FIG. 1 shows a developed perspective view of an opto-magnetic disk apparatus to which the present invention is applied. A manual unloading mechanism which is a feature of the present invention is omitted in FIG. 1.

The opto-magnetic disk apparatus 90 includes a cartridge holder mechanism which holds a cartridge and is designed to perform various functions including opening and closing of the shutter, a clamper mechanism having a disk clamper 104 and a biasing magnet 103, a driving mechanism, including a driving motor 43, a reduction gear train 42 and synchronizing gears 41, and a loading mechanism composed of cam racks and a driving pinion gear and capable of actuating the cartridge holder mechanism and the clamper mechanism between a loading start position at which loading is commenced and a recording/reproduction position at which the disk in the disk cartridge is accessed for the purpose of recording or reproduction.

Each of the mechanism portions mentioned above will be described hereinunder.

Referring again to FIG. 1, the cartridge holder mechanism portion includes a cartridge holder body 3 and a pair of first shutter levers 31 which are pivotable about respective fulcrums provided on the underside of the cartridge holder body 3. The first shutter levers 31 carry pins 31a which engage with guide grooves 3a formed in the wall of the cartridge holder body 3. The first shutter levers 31 are biased forward by means of springs (not shown) so as to keep the shutter levers 31 in the initial position as shown in FIG. 1. Second shutter levers 32 are pivotally secured to the respective shutter levers 31 for pivotal movement about fulcrums carried by the first shutter levers 31. The second shutter levers 32 are biased by springs 33 so as to be kept in initial positions as shown in FIG. 1. The cartridge holder mechanism portion further has holder stoppers 34 which are swingable about fulcrums provided on inner upright portions of the cartridge holder body 3. The holder stoppers 34 are set at positions shown in FIG. 1. Stepped rollers 35 are rotatably carried by pins secured to outer upright portions of the cartridge holder body 3.

Referring now to the clamper mechanism, this mechanism has a clamp base 105 and a biasing magnet 103 provided on the clamper base 105. The clamper mechanism also has a clamper 104 which is urged upward to an initial position as shown in FIG. 1 by means of a pair of levers 107 which are vertically swingable and spring-biased upward. Sliders 102 are secured to both sides of the clamp base 105. Each slider 102 has pins 121 which are received in holes 101b formed in a cooperating slider 101. Since the clamp base 105 is urged by springs 122, the pins 121 are held at reference positions where they contact the lower edges of the holes 101b.

Referring now to the driving mechanism, a driving motor 43 and a reduction gear train 42 having five gears are secured to a frame 4. The gear constituting the final stage of the reduction gear train 42 meshes with one of two synchronizing gears 41. Both synchronizing gears are fixed to a common shaft 44 so that they are driven synchronously. Two of the gears constituting the reduction gear train 42 in the illustrated embodiment are shown to be rotatably carried by the shaft 44.

Referring now to the loading mechanism, a pair of driving gears 11, including a large gear and a small gear, are secured to pins provided on each side panel of the apparatus. The small gear engages with an idler gear 12 which also is secured to a side panel 1. The idler gear 12 engages and is driven by one of the synchronizing gears 49. The large gear of the driving gear pair 11 is engaged by a rack gear portion (not shown) of a cam rack 2 which is in guided mutual engagement between pins 21 provided thereon and mating elongated slots 1b formed in each side panel 1.

Each of the aforementioned stepped rollers 35 engage with an L-shaped hole 1a formed in each side panel 1 so as to guide the cartridge holder body 3 during movement of the cartridge holder body 3. The clamp base 105 is guided by engagement between pins 121 and elongated holes 1c formed in the side panels 1. The cam racks 2 have guide grooves 2a which receive pins 36 on the cartridge holder body 3 and guide grooves 2b which receive pins 111 on the slider 101. Pins 14 on the side panels 1 are received in elongated holes 101a in the sliders 101 so as to guide the sliders 101 when the latter are moved.

The idler gears 12 mesh with synchronizing gears 41 of the driving mechanism.

The frame 4 is provided on the upper side thereof with a pair of pins 45 which are adapted to locate the cartridge when the disk cartridge is loaded in the apparatus.

Figure 2A:
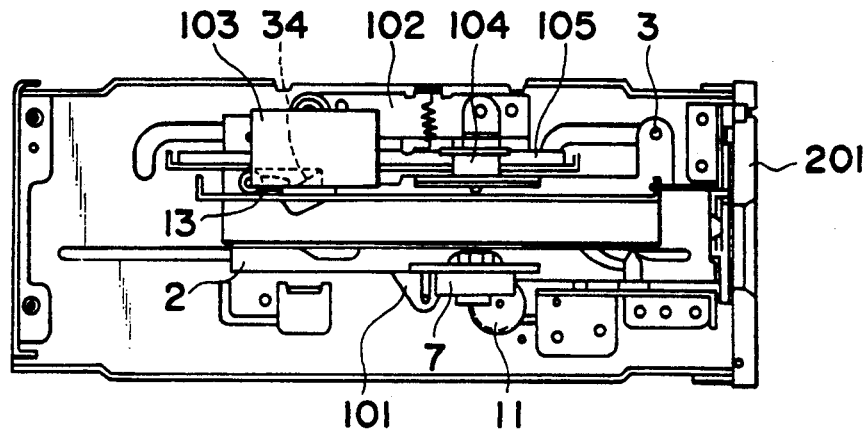
FIGS. 2A, 2B and 2C show, side sectional views of the apparatus of FIG. 1.
Figure 2B:
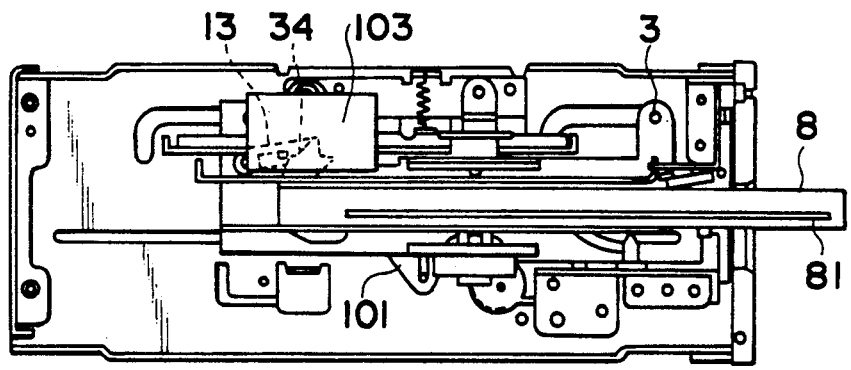
Figure 2C:
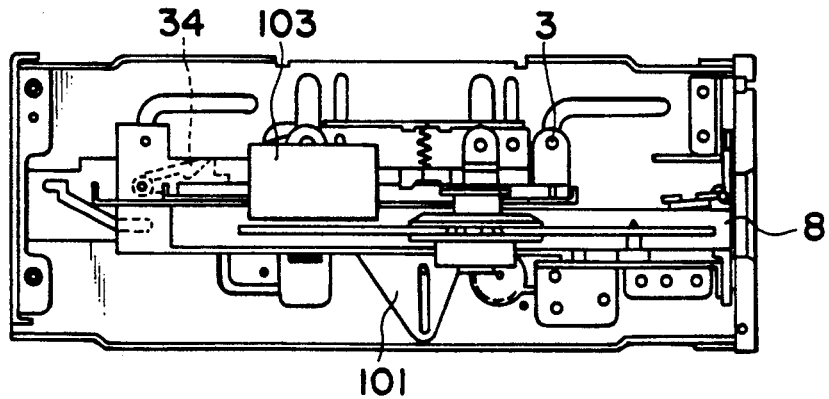
Figure 3A:
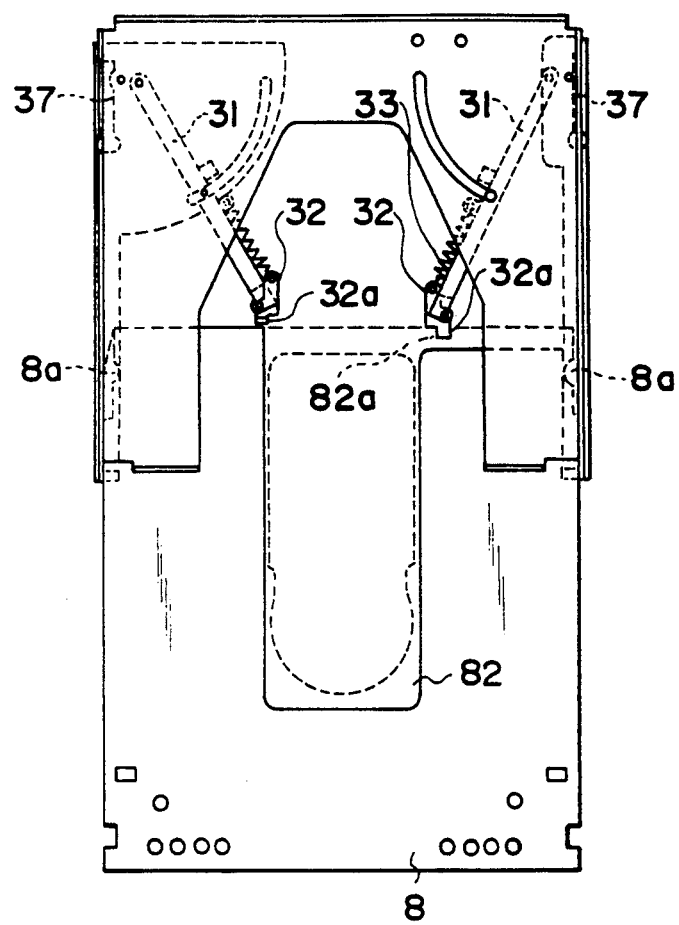
FIGS. 3A and 3B show plan views of a cartridge holder in the apparatus of FIG. 1, FIGS. 4A and 4B illustrate operations of a shutter lever in the apparatus of FIG. 1, FIGS. 5A and 5B illustrate operations of a cartridge stopper in the apparatus of FIG. 1, FIGS. 6A and 6B show side sectional views of a first embodiment of the information recording and reproducing apparatus of the present invention.
Figure 3B:
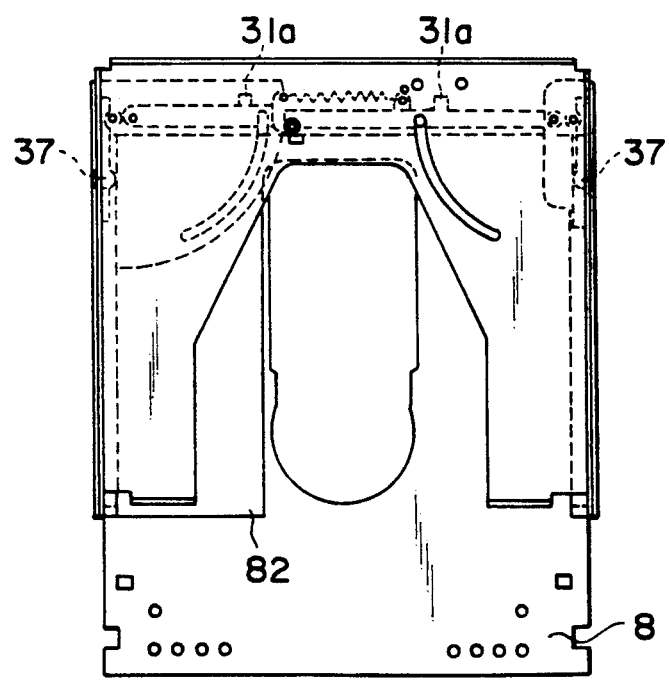

The operation of the apparatus will be described hereinunder, with specific reference to FIGS. 2A, 2B and 2C and FIGS. 3A and 3B. FIGS. 2A, 2B and 2C are sectional side elevational views of the apparatus shown in FIG. 1 in different states of operation: namely, in a state in which the disk cartridge is not inserted, in a state in which the disk cartridge is being loaded and in a state in which the disk cartridge has been loaded and the disk in the cartridge has been clamped. FIGS. 3A and 3B are plan views of the cartridge holder in a state in which the disk cartridge is being loaded and a state in which the disk cartridge has been fully inserted, respectively.

Referring to FIG. 2A, the parts of the apparatus are in the initial positions which are the same as those illustrated in FIG. 1. In this state, the position of the cartridge holder body 3 is limited by engagement between hooked portions of the holder stoppers 34 and the pins 13 on the side panels 1. The disk cartridge 8 is inserted through a cartridge insertion opening formed in a front panel 201. When the cartridge has reached a position shown in FIG. 3A, the end 32a of one of the shutter levers 32 which is on the right side as viewed in FIG. 3A, catches a notch 82a formed in a shutter 82 of the disk cartridge 8. Since there is no other notch in the shutter 82, the end 32a of the other shutter lever 32, which is on the left side of this figure, abuts the edge of the disk cartridge 8 so that the first shutter lever 31, associated with this shutter lever 32, is held at a position where it has been slightly rotated counter-clockwise. As the cartridge 8 is moved deeper into the apparatus, the first shutter levers 31 on the right and left sides of FIG. 3A are swung clockwise and counterclockwise, respectively, to positions shown in FIG. 3B. During the movement of the cartridge 8 from the position shown in FIG. 3A to the position shown in FIG. 3B, the second shutter lever 32 pivotally mounted on the right first shutter lever 31 acts to cause a leftward movement of the shutter 82 as viewed in FIGS. 3A and 3B.

As will be seen from FIG. 1, the pair of first shutter levers 31 are arranged in symmetry with respect to the line along which the center of the cartridge 8 moved during insertion, and are constructed such that they clear each other at positions where they cross each other and are parallel to each other when the cartridge 8 is in the loaded position. That is, both first shutter levers are offset from each other in the direction perpendicular to the plane of their swinging movement and to the plane of a disk held by the cartridge inserted into the apparatus. Thus, as can be seen from the drawings, when a cartridge 8 is inserted with its shutter 82 on top, the shutter notch 82a is engaged by the end 32a of the shutter lever 32 mounted on the lever 31 on the right hand side of the mechanism shown in FIG. 3A; and when a cartridge 8 is inserted in an inverted position, i.e., with its shutter 82 underneath, the shutter notch 82a is engaged by the end 32a of the shutter lever 32 mounted on the lever 31 at the left hand side of the mechanism shown in FIG. 3A.

Figure 4A:
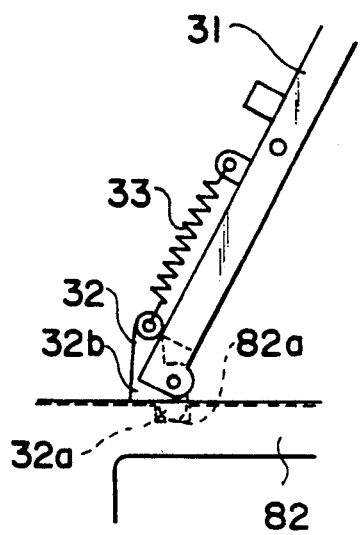
Figure 4B:
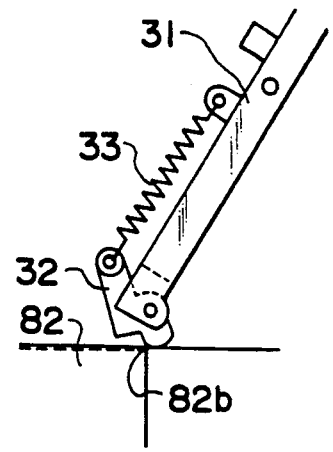
Figure 5A:
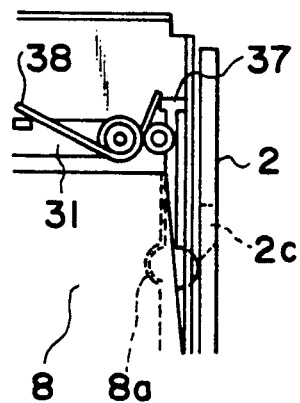

Operation of each portion of the apparatus will be explained in more detail with reference to FIGS. 4A and 4B which illustrate operation of the shutter levers and also to FIGS. 5A and 5B which are illustrative of the operation of the cartridge stoppers.

As stated before, the second shutter lever 32 on the operative first shutter lever 31 which is, in this case, the first shutter lever 31 shown on the right part of FIGS. 3A and 3B, is initially set at the position shown in FIG. 1 by the force of the spring 33. As the cartridge 8 is moved to bring the notch 82a in the shutter 82 thereof into engagement with the extreme end 32a of the shutter lever 32, the shoulder portion 32b on the end of the lever 32 fits on the edge of the notch 82a so as to prevent any further movement of the lever 32 and to prevent the shutter lever 32 from coming off the notch 82a in the shutter 82. In contrast, if the portion of the edge 82b of the shutter has no notch as shown in FIG. 4B, the shutter lever 32 is allowed to swing counterclockwise to clear the edge 82b.

Figure 5B:
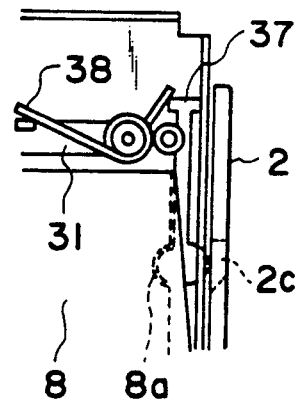

When the disk cartridge 8 has been moved into the position shown in FIG. 3B, it is urged by the cartridge stoppers 37, urged by the springs 38, as will be understood from FIG. 5B. In this state, the cartridge 8 is still detachable, because the locking force exerted by the springs 38 is not too strong.

When the cartridge 8 has been fully inserted as shown in FIG. 3B, the hooked portion of each holder stopper 34 is disengaged from the associated pin 13 on the side panel 1 (FIGS. 1 and 2C), so that the cartridge is movable horizontally.

When the state shown in FIG. 3B is attained, a projection 31a on the shutter lever 31 is detected by a photo-interrupter (not shown). The photo-interrupter produces a signal for allowing the driving motor 43 (see FIG. 1) to start, so that power of the motor 43 is transmitted to the cam racks 2 through the reduction gear train 42, synchronizing gears 41, idler gears 12 and the driving gears 11, so as to cause the cam racks 2 to move rearward. When the cam racks 2 have been moved to the position shown in FIG. 5A, an R-shaped projection on each cartridge stopper 37 is disengaged from a tapered hole 2c in each cam rack 2, so that the movement of the cartridge stopper 37 is limited, whereby the disk cartridge 8 is fixed to the cartridge holder body 3. In this state, the cartridge holder body 3 is not allowed to move.

As the cam racks 2 further move rearward, the cartridge holder body 3 is first moved horizontally and then moved downward so as to be fixed at a lowered position, by virtue of the presence of the L-shaped holes in the side panels 1 and guide grooves 2a in the cam racks 2 (FIG. 1). Meanwhile, the clamp base 105 is moved downward by virtue of the elongated holes 1c in the side panels 1 and the guide grooves 2b in the cam racks 2.

The stroke and timing of movement of the clamp base 105 are determined independently of the movement of the cartridge holder body 3. Since the clamp base 105 is urged by springs 122 through the sliders 101, the sliders 101 are moved downward even after the clamp base 105 is stopped by the cartridge holder body 3, until they are set in predetermined lowered positions.

It will be clear to those skilled in the art that an operation for ejecting the disk cartridge 8 can be conducted by following a procedure which is reverse to that described hereinbefore.

The manual unloading of the recording medium in an emergency which is a feature of the present invention, will now explained.

Figure 6A:
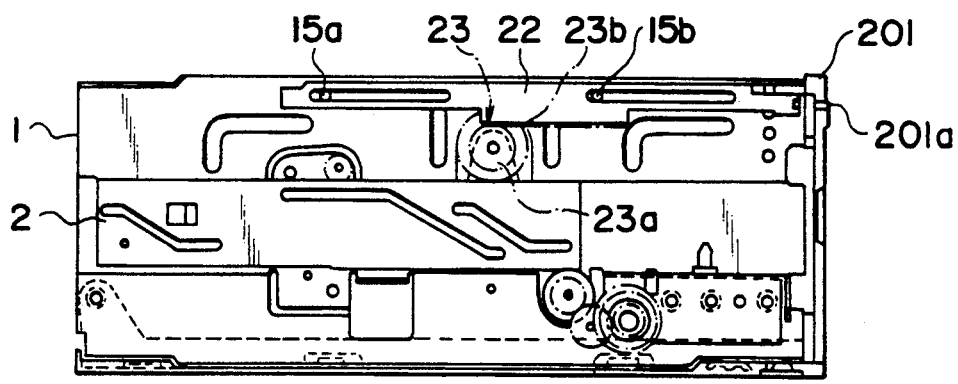
Figure 6B:
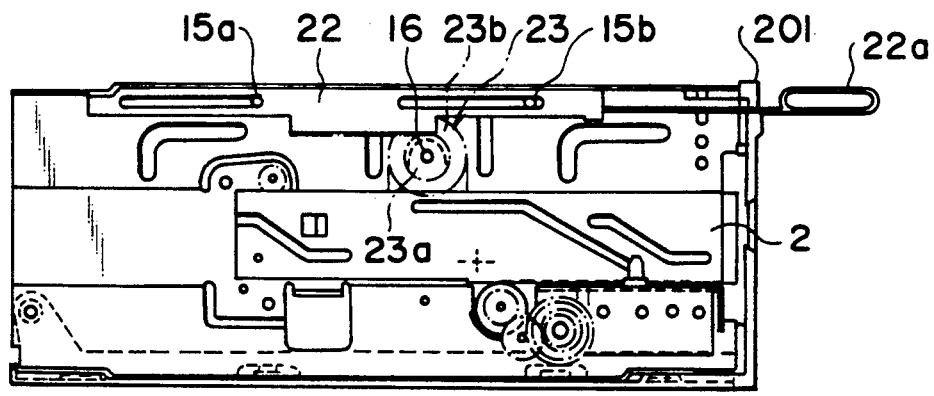

FIGS. 6A and 6B show side sectional views of a first embodiment of the present invention in which a manual unloading mechanism is added to the opto-magnetic disk apparatus described above. FIG. 6A shows a loading state and FIG. 6B shows an unloading (eject) state.

As shown, an emergency rack gear 22 is mounted on the side panel 1 so that it is slidably moved as guided by pins 15a and 15b fixed to the side panel 1. The rack gear 22 meshes with a smaller gear 23a of two-stage spur gear 23 mounted on the side panel 1 to be rotated around a pin 16 fixed to the side panel 1. A layer gear 23b of the two-stage gear 23 meshes with an upper rack of the cam rack 2 so that the cam rack 2 and the emergency rack gear 22 are moved in the opposite directions in different strokes. Accordingly, in normal loading and unloading operations by the motor 43, the emergency rack gear 22 is moved in linked relation with the cam rack 2.

In the loading state shown in FIG. 6A, if the emergency rack gear 22 is pressed by a rod, such as an end of a clip 22a through a hole 201a on the front panel 201, the emergency gear is moved backward so that the two-stage gear 23 is rotated counterclockwise. Since the emergency rack gear 22 meshes with the smaller gear 23a of the two-stage spur gear 23 and the cam rack 2 meshes with the larger gear 23b, the stroke of the emergency rack gear 22 is accelerated and it is transmitted to the cam rack 2 so that the cam rack 2 is moved toward the front panel 201.

When it moves to the position of FIG. 6B, the unloading state is established.

In this state, even if the end of clip 22 is pulled off, the cam rack 2 maintains the unloading state.

While the combination of rack gear and spur gear is used as linkage means for the emergency lever and the cam, it may be substituted by a link mechanism.

Figure 7A:
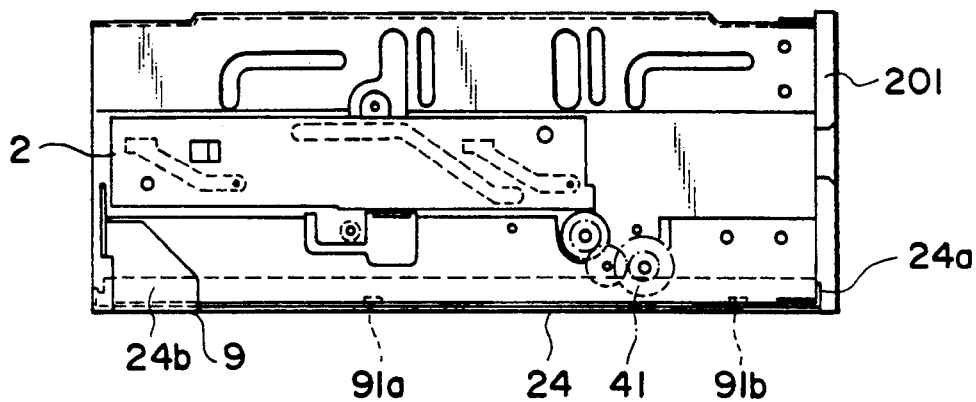
FIGS. 7A and 7B show side sectional views of a second embodiment of the information recording and reproducing apparatus of the present invention.
Figure 7B:
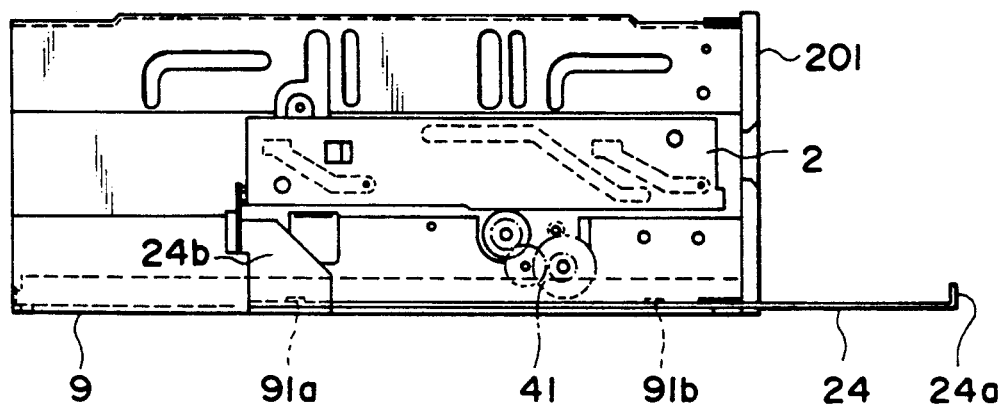

FIGS. 7A and 7B show side sectional views of a second embodiment of the present invention, in which a manual unloading mechanism is added to the opto-magnetic disk apparatus described above. FIG. 7A shows a loading state and FIG. 7B shows an unloading (eject) state.

As shown, a lever 24 is mounted on the base plate 9 so that it is slidably moved as guided by pins 91a and 91b. The lever 24 has a portion 24a and a cam rack engagement 24b. The lever 24 is biased backward with respect to the front panel 201 by a spring. Accordingly, the lever 24 has a home position which is the position shown in FIG. 7A. In the state of FIG. 7A, the lever 24 is kept at the home position when the electric powered loading and unloading operations are effected.

When the lever 24 is manually pulled forward with respect to the front panel 201 from the loading state of FIG. 7A, the cam rack 2 moves forward with respect to the front panel 201. Then, the synchronization gear 41 shown in FIG. 1 rotates and the opposite cam rack 2 moves forward. When the lever 24 is moved to the position of FIG. 7B, the unloading state is established. When the lever 24 is released, the lever is pulled backward by the unshown spring and returns to the home position.

While a lever is used as means for pulling out the cam rack for a manual unloading operation in the present embodiment, the lever may be substituted by a piano wire or a string, for example.

The present invention may be modified in various ways. For example, while the cartridge type recording medium is used in the embodiment, the present invention is equally applicable to a non-cartridge type recording medium. The present invention is not limited to an opto-magnetic disk apparatus, but it is also applicable to an optical disk apparatus or a magnetic disk apparatus.

The present invention covers all of those modifications without departing from the scope of claims.

What is claimed is:

1. An information recording/reproducing apparatus for effecting at least one of information recording on and information reproducing from a recording medium, said apparatus comprising:
    a front panel having an opening formed therein for allowing insertion and discharge of the recording medium between an insertion position and a discharge position, respectively;
    a holder for receiving the recording medium inserted through the opening in said front panel, said holder comprising a drive source for automatically transporting the recording medium in a transport direction along a transport path arranged substantially perpendicular to said front panel, from the insertion position to a loading position and from the loading position to the discharge position;
    a slidable member movable in the recording medium transport direction and engageable with said holder in the loading position, said slidable member maintaining engagement with said holder when moved;
    a lever member integrally coupled to said slidable member and adapted to be pulled through said front panel for moving said slidable member toward the discharge position; and
    wherein the recording medium is transported from the loading position to the discharge position by manually pulling said lever member through said front panel when said drive source is rendered inoperative due to an abnormal operating condition.

2. An apparatus according to claim 1, further comprising drive means for driving said slidable member.

3. An apparatus according to claim 1, further comprising means for clamping the recording medium when inserted in said apparatus and for releasing the recording medium when discharged from said apparatus.

4. An information recording/reproducing apparatus for effecting at least one of information recording on and information reproducing from a recording medium, said apparatus comprising:

a front panel having a first opening formed therein for allowing insertion and discharge of the recording medium and a second opening formed therein separately from and smaller than the first opening;

a holder for receiving the recording medium inserted through the first opening in said front panel, and for transporting the recording medium from an insertion position in a horizontal transport direction and for then lowering the recording medium in a vertical loading direction to automatically load the recording medium to a loading position;

a holder locking member for locking said holder in the insertion position when said holder receives the recording medium inserted through the first opening and when the recording medium is discharged from said holder through the first opening;

a pushing member provided in said holder for pushing the recording medium from said holder by a pushing force;

a recording medium locking member for locking the recording medium in said holder when said holder receives the recording medium; and a slidable member slidable in directions opposite to the transport directions of the recording medium in association with transport movement of said holder, wherein said holder locking member releases the lock of said holder and said recording medium locking member locks the recording medium in said holder when said holder receives the recording medium inserted through the first opening and against the pushing force of the pushing member, and then said holder transports the recording medium in the horizontal transport direction and lowers the recording medium in the vertical loading direction to load the recording medium to the loading position, said slidable member being positioned adjacent the second opening in said front panel when the recording medium is in the loading position in association with loading movement of said holder, and said holder being moved from the loading position to the insertion position by pushing said slidable member toward the loading position by inserting a rod-like member through the second opening in said front panel, said holder locking member locking said holder in the insertion position and said recording medium locking member releasing the lock of the recording medium to discharge the recording medium from said holder by said pushing member when automatic transportation of said holder is rendered impossible under an abnormal operating condition.

5. An apparatus according to claim 4, further comprising a gear and cam rack for moving said slidable member, said slidable member being coupled to said holder by said gear and cam rack.

6. An apparatus according to claim 5, said gear and cam rack comprising means for transmitting movement of said slidable member to said holder, the movement being accelerated when transmitted.

7. An information recording/reproducing apparatus for effecting at least one of information recording on and information reproducing from a recording medium, said apparatus comprising:

a front panel having an opening formed therein for allowing insertion and discharge of the recording medium between an insertion position and a discharge position, respectively;

a holder for receiving the recording medium inserted through the opening in said front panel, said holder automatically transporting the recording medium in transport directions from the insertion position to a loading position and from the loading position to the discharge position;

a slidable member movable in the recording medium transport directions and engageable with said holder in the loading position, said slidable member maintaining engagement with said holder when moved; and a lever member integrally coupled to said slidable member and adapted to be pulled through said front panel for moving said slidable member toward the discharge position; and wherein the recording medium is transported from the loading position to the discharge position by manually pulling said lever member through said front panel when automatic transportation of said holder is rendered impossible under an abnormal operating condition.

8. An apparatus according to claim 7, further comprising drive means for driving said slidable member.

9. An apparatus according to claim 7, further comprising means for clamping the recording medium when inserted in said apparatus and for releasing the recording medium when discharged from said apparatus.

* * * * *

UNITED STATES PATENT AND TRADEMARK OFFICE
CERTIFICATE OF CORRECTION

PATENT NO. :  5,297,117
DATED      :  March 22, 1994
INVENTOR(S) : Kazuo UZUKI, et al.

It is certified that error appears in the above-identified patent and that said Letters Patent is hereby corrected as shown below:

ON THE TITLE PAGE:

UNDER "FOREIGN PATENT DOCUMENTS":

"61-31061 2/1987 Japan" should read --62-31061 2/1987 Japan--.

COLUMN 1:

Line 27, "malfunction" should read --malfunctions--; and
Line 59, "FIG. 1." should read --FIG. 1,--.

COLUMN 3:

Line 45, "positions" should read --positions,--.

COLUMN 5:

Line 25, "now" should read --now be--.

Signed and Sealed this

Thirteenth Day of September, 1994

Attest:

BRUCE LEHMAN

Attesting Officer        Commissioner of Patents and Trademarks